United States Patent [19]

Nozawa

[11] 4,437,550
[45] Mar. 20, 1984

[54] INDUSTRIAL VEHICLE DRIVING APPARATUS

[75] Inventor: Koji Nozawa, Higashikurume, Japan
[73] Assignee: Nissan Motor Company, Limited, Yokohama, Japan
[21] Appl. No.: 296,820
[22] Filed: Aug. 27, 1981
[30] Foreign Application Priority Data Sep. 12, 1980 [JP] Japan .................. 55-126809

[51] Int. Cl.³ .................. B60K 41/24; B60K 41/28
[52] U.S. Cl. .................. 192/324; 192/3.23; 74/411.5
[58] Field of Search .................. 192/3.24, 3.23, 3.34, 192/4 A, 115, 112; 74/411.5

[56] References Cited

U.S. PATENT DOCUMENTS

| 2,747,430 | 4/1959 | Förster et al. | 192/4 A |
| 3,306,131 | 2/1967 | Eaton et al. | 192/4 A |

FOREIGN PATENT DOCUMENTS

| 2803730 | 8/1978 | Fed. Rep. of Germany . |
| 3021162 | 12/1980 | Fed. Rep. of Germany . |
| 567678 | 10/1975 | Switzerland . |
| 2062777 | 5/1981 | United Kingdom . |

Primary Examiner—George H. Krizmanich
Assistant Examiner—Mark Manley
Attorney, Agent, or Firm—Schwartz, Jeffery, Schwaab, Mack, Blumenthal & Koch

[57] ABSTRACT

A common housing is used for a torque converter or clutch and a center brake device. The drive shaft of the torque converter or clutch is connected to the input shaft of a transmission, which is housed in a housing adjacent to the common housing. The output shaft of the transmission lies parallel to the input shaft and the clutch drive shaft and extends into the common housing. The center brake device is fixed to the free end of the transmission output shaft and within the space defined by the converter or clutch housing. To minimize housing dimensions, the center brake device and the clutch or torque converter share the space defined by the converter or clutch housing. To better ventilate and cool the clutch or torque converter, the common space may open directly to atmosphere through an opening in the housing.

4 Claims, 2 Drawing Figures

FIG. I
(PRIOR ART)
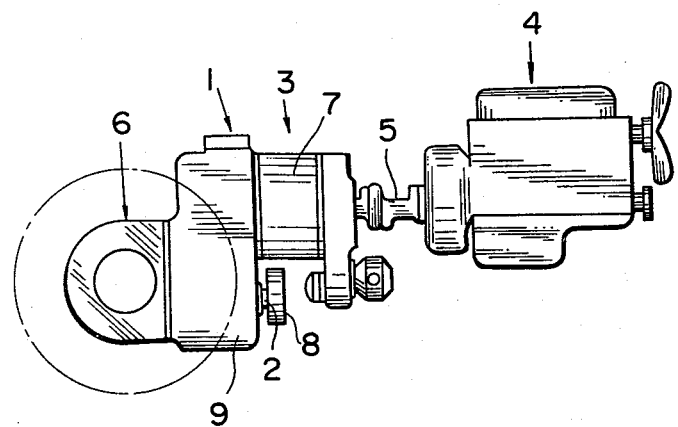

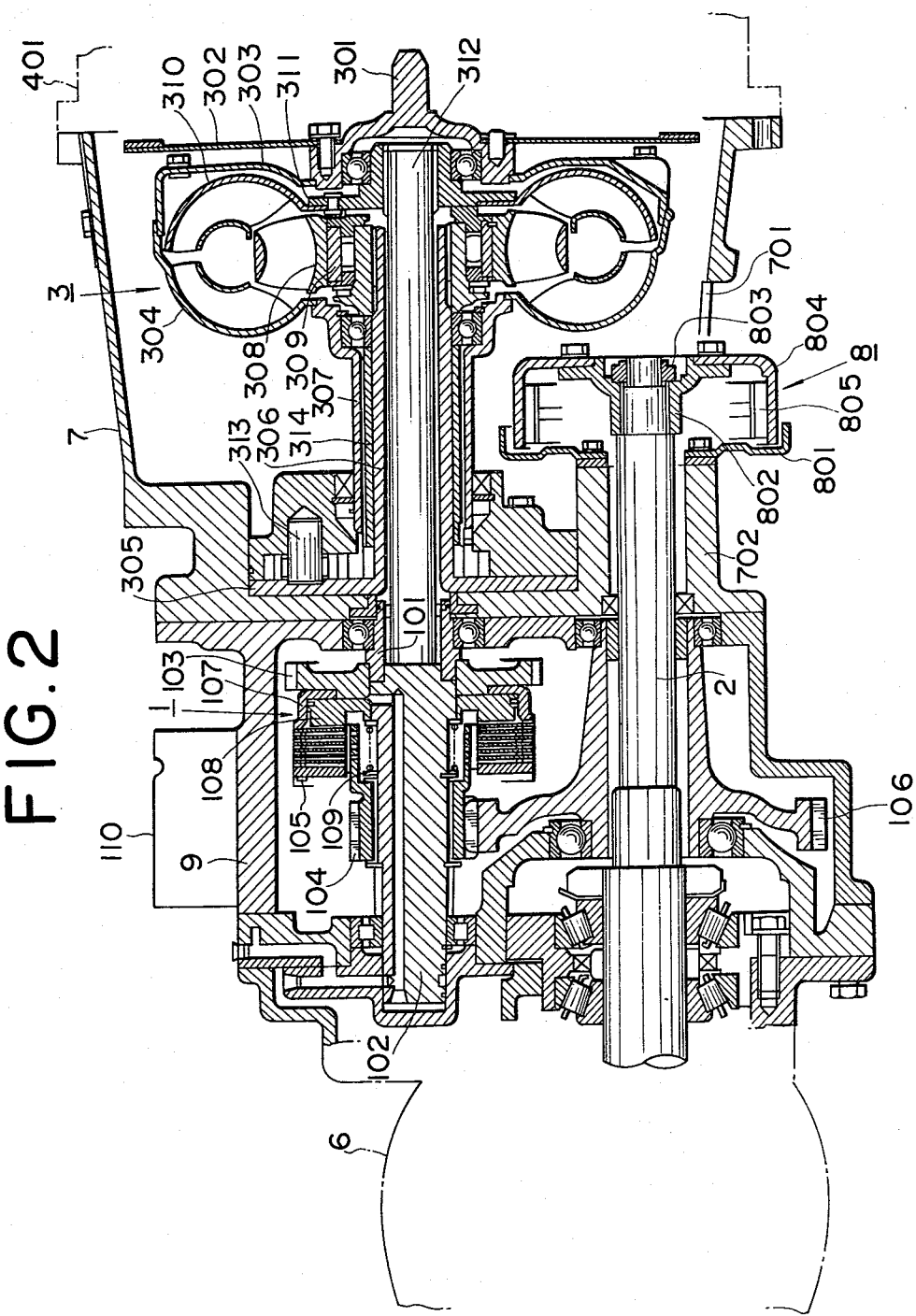

INDUSTRIAL VEHICLE DRIVING APPARATUS

BACKGROUND OF THE INVENTION

1. Field of the Invention

The present invention relates to an apparatus for driving an industrial vehicle, and more particularly to an industrial vehicle driving apparatus such that all or a part of the center brake device is disposed within the torque converter or the clutch housing.

2. Description of the Prior Art

Driving apparatus for industrial vehicles generally comprises an engine, a torque converter or clutch, a transmission, a final drive and so on. In the conventional apparatus, a single driving apparatus is formed by connecting the respective housings for the engine, torque converter or clutch and the transmission, and further by making the housing for the final drive integral with the housing for the transmission.

When a center brake which serves as a parking brake device is additionally provided for the driving apparatus, however, it is necessary to separate the transmission housing from the final drive housing in order to dispose the center brake therebetween. To avoid this disadvantage, there exists a driving apparatus such that the output shaft of a transmission projects from the side of the torque converter or clutch.

In this prior-art apparatus, however, since the torque converter or clutch housing interferes with the brake drum, the torque converter or clutch housing are designed to be narrow, or the interval between the two shafts of the transmission are designed to be long. In the former case, a problem arises in that it is difficult to design a driving apparatus provided with enough strength for this purpose, and in the latter case, the transmission inevitably becomes large in size.

SUMMARY OF THE INVENTION

With these problems in mind therefore, it is the primary object of the present invention to provide an industrial vehicle driving apparatus such that all or a part of the center brake device is disposed within the torque converter or clutch housing, so that a narrowing of the torque converter or clutch housing can be avoided and a sufficiently strong driving apparatus can be provided, in spite of a relatively small distance between the input shaft and the output shaft of the transmission and of a relatively small-sized transmission.

To achieve the above-mentioned object, the industrial vehicle driving apparatus according to the present invention comprises a torque converter or clutch housing, and a center brake device disposed on the output shaft of the transmission projecting from the side of the torque converter or clutch housing, all or a part of which is disposed within the space of the torque converter housing, without providing a narrower part to avoid interference with the center brake device.

BRIEF DESCRIPTION OF THE DRAWINGS

The features and advantages of the industrial vehicle driving apparatus according to the present invention will be more clearly appreciated from the following description taken in conjunction with the accompanying drawings in which like reference numerals designate corresponding elements and in which:

FIG. 1 is a diagrammatical pictorial view for assistance in explaining a prior-art vehicle driving apparatus; and FIG. 2 is a cross-sectional view showing an embodiment of the industrial vehicle driving apparatus according to the present invention.

DETAILED DESCRIPTION OF THE PREFERRED EMBODIMENTS

To facilitate understanding of the present invention, a brief description of the prior-art of the industrial vehicle driving apparatus will be made hereinafter with reference to FIG. 1.

In the prior-art driving apparatus, the output shaft 2 of the transmission 1 projects from the side of the torque converter 3 or the clutch, as shown in FIG. 1.

In a driving apparatus of this type, since the output of the engine 4 is first transmitted to the torque converter 3 or the clutch through a propeller shaft 5 and the next to the final drive device 6 after having its speed reduced by the transmission 1. A torque converter housing 7 used to house the torque converter 3. In the case of a clutch, the housing 7 represents a clutch. Obviously, the housing 7 may housing used to house the clutch interfere with the brake drum of a center brake device 8. To avoid this problem, the torque converter or clutch housing 7 is typically designed to be narrow, or the distance between the input shaft and the output shaft of the transmission are designed to be long. In the former case, a problem arises in that it is difficult to design a sufficiently strong driving apparatus, and in the latter case, the transmission becomes inevitably large in size.

In view of the above description there is described an industrial vehicle driving apparatus according to the present invention with reference to the attached drawing. FIG. 2 shows a first embodiment of the industrial vehicle driving apparatus.

First, the structure is described hereinbelow. In FIG. 2, a torque converter 3 and a transmission 1 for a forklift are illustrated. The torque converter 3 is housed within a torque converter housing 7 connected to an engine housing 4, and the transmission 1 is housed within a transmission housing 9. The input shaft 301 of the torque converter 3 is connected to the crankshaft of an engine (not shown), a drive plate 302 and a converter cover 303 are fixed to the input shaft 301, and a pump impeller 304 is fixed to the converter cover 303.

Reference numeral 305 denotes a front cover, and a sleeve 307 fixed to the pump impeller 304 is rotatably supported around a spacer ring 314 on a hollow shaft 306 which is formed integrally with the front cover 305. Numeral 308 denotes a stator rotatably supported on the hollow shaft 306 by a one-way clutch 309, and numeral 310 denotes a turbine runner. The hub 311 of the turbine runner 310 is spline-connected to an output shaft 312 rotatably inserted into the hollow shaft 306. Numeral 313 denotes an oil pump.

The output shaft 312 of the torque converter 3 is spline-connected to the input shaft 101 of the transmission 1, and the input shaft 101 is fixed to a drive gear 103 fixed to a forward drive shaft 102. Numeral 104 denotes a forward gear rotatably supported on the forward drive shaft 102. Numeral 105 denotes a forward drive clutch to engage or disengage the torque applied between the drive gear 103 and the forward gear 104. Numeral 2 denotes an output shaft of the transmission 1, and a reduction gear 106 meshing with the forward gear 104 is spline-connected to the output shaft 2.

In addition, the reduction gear 106 is meshed with a reverse gear (not shown) which is rotatably supported by a reverse drive shaft (not shown). To the reverse drive shaft, a driven gear (not shown) is fixed, and a reverse drive clutch is disposed between the driven gear and the reverse gear in the same manner as in the case between the drive gear 103 and the forward gear 104. Accordingly, the reduction gear 106 always meshes with either the forward gear 104 or the reverse gear, being driven by either of the gears to rotate the output shaft 2. Numeral 107 denotes a clutch drum forming the forward drive clutch 105, being fixed to the forward drive shaft 102. Numeral 108 denotes a clutch piston forced rightward by a spring 109 in the figure. And numeral 110 denotes a control valve box.

The left end (as seen in FIG. 2) of the output shaft 2 is connected to the final drive device 6, and the right end (torque converter end) of the output shaft 2 is disposed to project outward from the transmission housing 9. At the right end of the output shaft 2, there is provided a center brake device 8, the larger part of which is disposed within the space of the torque converter housing 7. To the right of the center brake device 8, an opening 701 is formed in the torque converter housing 7 so as to communicate the interior thereof with the exterior. The right end of the output shaft 2 which projects from the transmission housing 9 is covered by a cylindrical portion 702 of the torque converter housing 7, and a back plate 801 is fixed to the end of the cylindrical portion. On the right end of the output shaft 2, a hub 802 is spline-connected and is locked by a nut 803 so as not to fall off. A brake drum 804 is fixed to the hub 802, and a brake shoe 805 is in contact with the inner surface of the brake drum 804. It may be possible to dispose the center brake device 8 thus constructed within the space of the torque converter housing 7. Further, when the brake drum 804 is disposed near the torque converter 3 to utilize the movement of air produced by the rotation of the brake drum 804, it is possible to cool the torque converter 3. In this case, it is possible to increase the cooling effect by providing fins for the brake drum 804 and by forming the largest opening 701 in the torque converter housing 7 as large as possible with the limitation that the housing 7 is strong enough.

Although in the described embodiment a torque converter 3 is used, it is of course possible to use a clutch in place of the torque converter. In this case a clutch housing is substituted for the torque converter housing 7.

Next, there is explained hereinbelow the operation of the embodiment of the industrial vehicle driving apparatus according to the present invention.

When the crankshaft of the engine begins rotating and therefore the input shaft 301 of the torque converter 3 is rotated, the drive plate 302, the cover 303, the pump impeller 304, and the sleeve 307 all rotate since they are formed integrally with the input shaft of the torque converter. Accordingly, centrifugal force applied to the working fluid within the pump impeller 304 produces a stream moving axially and tangentally, and therefore circulation occurs flowing from the turbine runner 310, the stator 308, and returning to the pump impeller 304. The circulation stream thus produced rotates the turbine runner 310 in the same direction as that of the pump impeller 304. A rotational force is transmitted from the turbine hub 311 of the input shaft 101 of the transmission 1 through the output shaft 312.

When the input shaft 101 begins rotating, the drive gear 103, the forward drive shaft 102, and the clutch drum 107 also rotate, thus the driven gear (not shown) meshed with the drive gear 103, the reverse drive shaft (not shown), and the clutch drum (not shown) of the reverse drive clutch are all rotated at the same time. Therefore, when either the forward drive clutch 105 or the reverse drive clutch is operated, either the forward gear 104 or the reverse gear (not shown) is rotated and the reduction gear 106 which meshes with either of the two gears is rotated in either the direction of forward movement or direction of the reverse movement to rotate the output shaft 2. The rotational output transmitted from the output shaft 2 is transmitted to the final drive device 6 and reduced in speed to be transmitted to the wheels of a folklift to drive it.

When the output shaft 2 rotates, the hub 802 of the center brake device 8 and the brake drum 804 rotate. The rotation of the hub 802 and the brake drum 804 produces an air stream on the outside of the brake drum 804, and a draught is produced within the torque converter housing 7 in cooperation with the rotational movements of the converter cover 303 of the torque converter 3 and the pump impeller 304. This draught can cool the torque converter 3 and efficiently ventilate the torque converter housing 7 through the opening 701.

Further in this embodiment, if the brake shoes 805 are pushed outward by operating the brake lever, for example when parking the vehicle, the brake shoes 805 come into contact with the inner peripheral of the brake drum 804 stopping the drum from rotating. Since the brake drum 804 is stationary, the output shaft 2 also becomes stationary.

When the output shaft 2 is stopped, since the final drive device 6 and the wheels connected to the final drive device 6 through a drive accelerator are also stopped, it is possible to park the vehicle.

Further, in this embodiment, it is possible to use the opening 701 provided in the torque converter housing 7 as a handhole for removing, checking or reparing the center brake device 8.

As described hereinabove, in the industrial vehicle driving apparatus according to the present invention, since the center brake device is disposed on the output shaft of the transmission projecting from the side of the torque converter or clutch housing, and since all or a part of the center brake device is disposed within the space of torque converter housing, it is unnecessary to provide a narrower part to avoid interference with the center brake device.

Further, as a result, since it is possible to design the torque converter housing to be strong enough without a narrower portion, it is possible to construct an industrial vehicle driving apparatus of the direct-coupled structure type such that the torque converter or clutch housing is connected in series with the transmission housing, or additionally the engine housing and the final drive housing are connected therewith without reducing the strength of the housing.

Further, since at least a part of the center brake device is disposed within the space of the torque converter or the clutch housing, it is possible to reduce the distance between the input shaft and the output shaft of the transmission, thus realizing a small-sized transmission.

Furthermore, since the center brake device rotates within the space of the torque converter or clutch housing, it is possible to cool the torque converter or clutch by the air stream produced by the rotation of the center brake device.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A driving apparatus for an industrial vehicle comprising:
   (a) a torque converter;
   (b) a transmission;
   (c) a torque converter housing for protecting said torque converter, said torque converter housing defining a space therein;
   (d) a transmission housing for protecting said transmission, said transmission housing being connected in series with said torque converter housing;
   (e) an output shaft of said transmission, one end of said output shaft being disposed within the space defined by said torque converter housing; and
   (f) a center brake device for applying a braking force to said output shaft, said center brake device being disposed at the end of said output shaft housed within the space defined by said torque converter housing.

2. A driving apparatus for an industrial vehicle which comprises:
   (a) a clutch;
   (b) a transmission;
   (c) a clutch housing for protecting said clutch, said clutch housing defining a space therein;
   (d) a transmission housing for protecting said transmission, said transmission housing being connected in series with said clutch housing;
   (e) an output shaft of said transmission, one end of said output shaft being disposed within the space defined by said clutch housing; and
   (f) a center brake device for applying a braking force to said output shaft, said center brake device being disposed at the end of said output shaft housed within the space defined by said clutch housing.

3. A driving apparatus for an industrial vehicle as set forth in claim 1, said torque converter housing having an opening, through which the space defined by said torque converter housing communicates with exterior space.

4. A driving apparatus for an industrial vehicle as set forth in claim 2, said clutch housing having an opening through which the space defined by said clutch housing communicates with exterior space.

* * * * *